Dec. 18, 1945.   H. M. SLOSBERG   2,391,354
METHOD OF TESTING FILLED SEALED CANS FOR LEAKS
Filed May 5, 1944
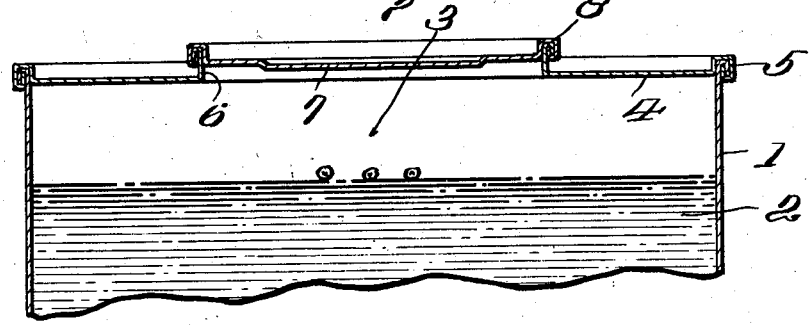
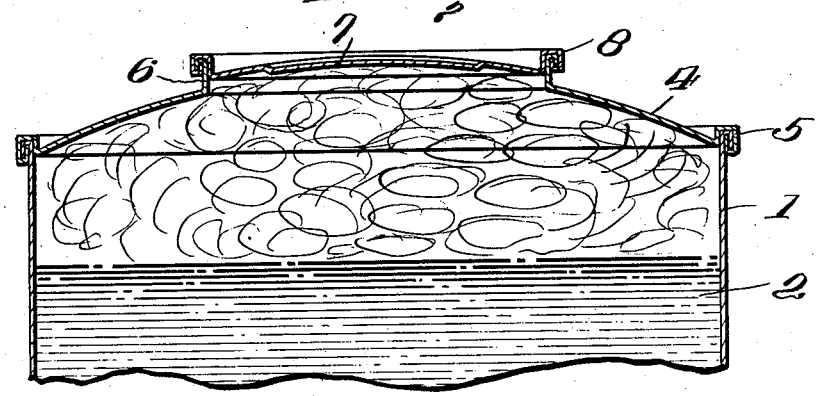
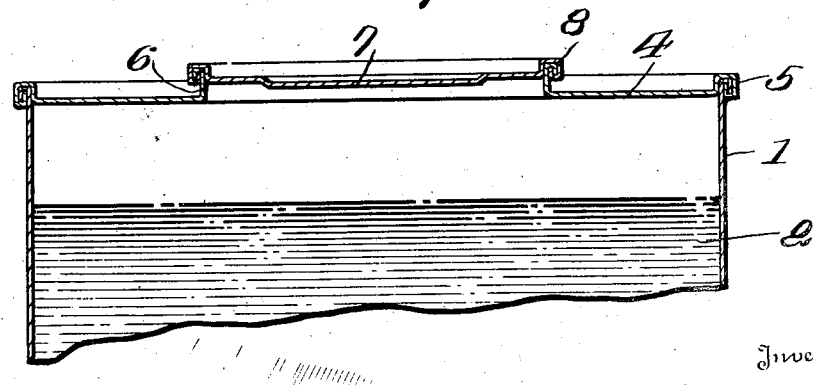
Inventor
H. M. Slosberg
By Mason, Porter & Diller
Attorneys Patented Dec. 18, 1945

2,391,354

UNITED STATES PATENT OFFICE 2,391,354

METHOD OF TESTING FILLED SEALED CANS FOR LEAKS

Harry M. Slosberg, Ames, Iowa, assignor to Continental Can Company, Inc., New York, N. Y., a corporation of New York Application May 5, 1944, Serial No. 534,385

3 Claims. (Cl. 73—52)

The invention relates to new and useful improvements in a method of testing filled sealed cans for leaks. Milk products such as whole powdered milk and other similar products are often packed in large cans, cans which are capable of holding from twenty-five to fifty pounds of the product. A great deal of difficulty has been experienced in testing cans of this type for leaks after the cans have been filled and sealed, due to the fact that the cans are so large that an expensive apparatus is necessary in the carrying out of the present methods of testing filled sealed cans.

An object of the invention is to provide a method of testing filled sealed cans of the type mentioned which does not require the use of any expensive apparatus.

A further object of the invention is to provide a method of testing the filled sealed cans wherein the cans may be sealed at atmospheric pressure and wherein the cans will be restored to an internal pressure after testing, which will not impose any strain whatever on the seams of the can.

A still further object of the invention is to provide a method of testing of the above type which does not interfere in any way with the sealing of the can in the presence of inert gas.

These and other objects will in part be obvious and will in part be hereinafter more fully disclosed.

In the drawing:

Figure 1 is a view showing more or less diagrammatically and in section a container which has been filled and sealed preparatory to carrying out applicant's testing method;

Figure 2 is a view similar to Figure 1 showing the solid carbon dioxide changed into a gas which has created an internal pressure sufficient to bulge the walls of the can;

Figure 3 is a view similar to Figure 2 but showing the carbon dioxide gas as having been absorbed to a sufficient extent by the product in the container to relieve the internal pressure and restore the walls to their normal flat condition.

The method of testing filled sealed cans for leaks is particularly adapted for the testing of large cans in which milk products such as dry powdered milk are packed. In carrying out the method the milk product is placed in a can and before sealing the can small particles of solid carbon dioxide are placed therein. This solid carbon dioxide may be placed in the can before the milk product, with the milk product, or after the milk product has been placed therein. As shown in Figure 1, a can body 1 contains therein a milk product indicated at 2, and lying on the milk product are small particles of solid carbon dioxide, indicated at 3. Attached to the body is a closure end 4 by a double seam, indicated at 5.

Centrally of this closure end 4 is an opening surrounded by a raised sleeve 6 to which the closure cap 7 is attached by double seaming, as indicated at 8. The container is filled through this opening before the cap is attached thereto. The usual method of packaging milk powder consists in the placing of the milk powder in the can, then inserting the can in a bell with the cap loosely applied thereto, drawing a vacuum on the bell to remove air from the head space of the container, after which the vacuum is replaced by an inert gas. In connection with milk powder nitrogen is preferably used. After the head space of the container has been treated in the manner stated above, the cap is seamed to the container end by the double seam referred to.

After the container has been filled and sealed, it is allowed to stand for a period of approximately twelve hours. During this time the solid carbon dioxide sublimates into a gas. A sufficient quantity of solid carbon dioxide is placed in the container so that the gas produced thereby will produce an internal pressure which is sufficient if the can is free from leaks, to cause a bulging of the walls of the can, as indicated in Figure 2 of the drawing. Sometimes these large cans have flat sides and sometimes they are round. With the flat sides there would be a bulging of the side walls as well as the ends. If the can contains a leaky joint the gas created upon the sublimation of the solid carbon dioxide can escape and the internal pressure will not be sufficient to cause a bulging of the walls. With ordinary leaks the bulging walls will become flat in from two to four hours. If the leak is very small, it is possible that the bulging walls will not return to flat condition until after eight to twelve hours of standing. If, at the end of a twelve-hour period, the walls of the can are still bulging, this indicates that the joints are tight and free from a leak. If, however, the walls are flat, this indicates that there is a leak, so that the gas pressure created by the sublimation of the carbon dioxide is insufficient to cause a bulging of the walls. All such cans with flats are removed.

While the pressure of the carbon dioxide gas may be kept relatively low so as not to exceed two pounds, nevertheless if the can stands for a long period of time in storage under this pressure the strain on the seams may rupture the same and cause leaks. It is well known that dry milk powder has the capability of absorbing a certain amount of carbon dioxide gas. In carrying out the method, therefore, the quantity of solid carbon dioxide used is such that the product will absorb in due course of time sufficient of the carbon dioxide gas to reduce the pressure to substantially normal sealing pressure and permit the walls to return to their initial flat condition. This return of the walls to their flat condition occurs within a day or two after packing.

While the method has been described as applied to the packaging of milk products, it will be understood that it may be used in connection with other products which are gas-packed to ensure elimination of oxygen, but of course the product must be capable of absorbing, to some extent at least, the carbon dioxide so as to reduce the pressure on the can after the testing period.

I claim:

1. The method of testing filled sealed metal cans for leaks in which is packed a product capable of absorbing carbon dioxide gas, comprising placing in the cans before sealing solid carbon dioxide in sufficient quantity to create an internal pressure on sublimation, which causes the walls of the can to bulge if free from leaks, separating, after a period of time sufficient to permit sublimation of the carbon dioxide, the cans with bulging walls from the cans with flats, the quantity of carbon dioxide being such that the product will absorb in due course of time sufficient of the carbon dioxide gas so as to reduce the pressure and permit the walls of the can to return to their initial flat condition.

2. The method of testing filled sealed metal cans for leaks in which is packed a product capable of absorbing carbon dioxide gas, comprising placing in the cans before sealing solid carbon dioxide in sufficient quantity to create an internal pressure on sublimation, which causes the walls of the can to bulge if free from leaks, separating after a period of eight to twelve hours the cans with bulging walls from those with flats, the quantity of carbon dioxide being such that the product will absorb in a few days after testing sufficient of the carbon dioxide gas so as to reduce the pressure and permit the walls of the can to return to their initial flat condition.

3. The method of testing filled sealed metal cans for leaks in which is gas-packed dry milk powder, comprising placing in the cans before gassing and sealing, small particles of solid carbon dioxide in sufficient quantity to create an internal pressure on sublimation, which causes the walls of the can to bulge if the cans are free from leaks, separating after a period of from eight to twelve hours the cans with bulging walls from those with flats, the quantity of carbon dioxide being such that the milk powder will absorb in a few days sufficient of the carbon dioxide gas so as to reduce the pressure and permit the walls of the can to return to their initial flat condition.

HARRY M. SLOSBERG.